L. MARKEL.
METHOD OF AND MEANS FOR FORMING SCREW THREADS.
APPLICATION FILED JUNE 8, 1906.
936,249.
Patented Oct. 5, 1909.
2 SHEETS—SHEET 1.
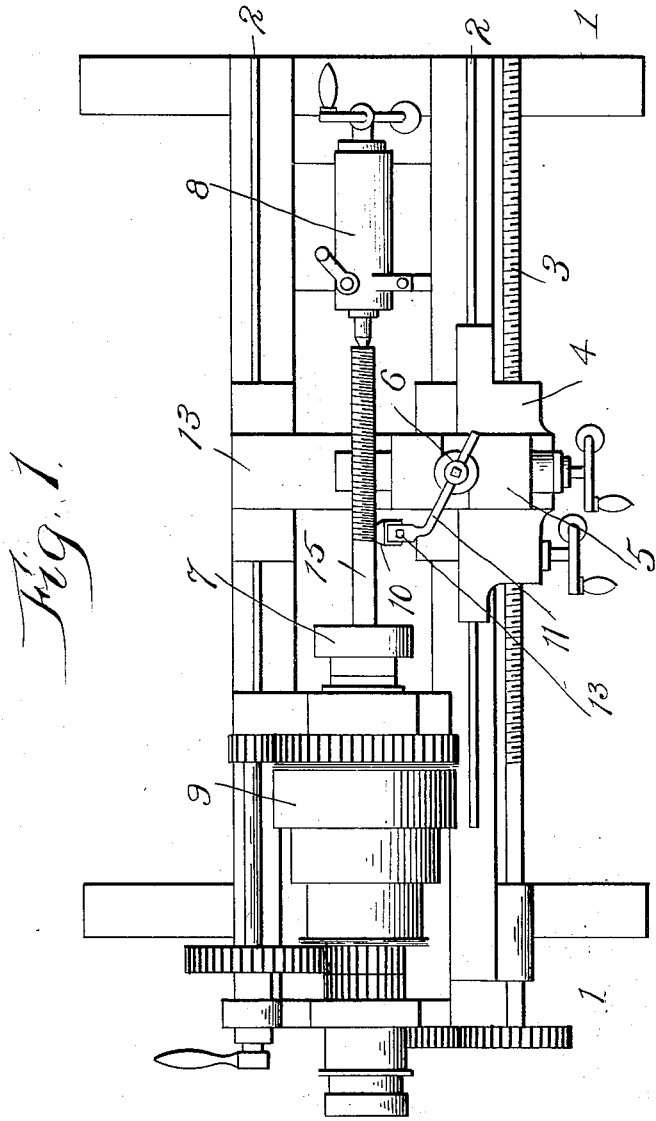

L. MARKEL.
METHOD OF AND MEANS FOR FORMING SCREW THREADS.
APPLICATION FILED JUNE 8, 1906.
936,249.
Patented Oct. 5, 1909.
2 SHEETS—SHEET 2.
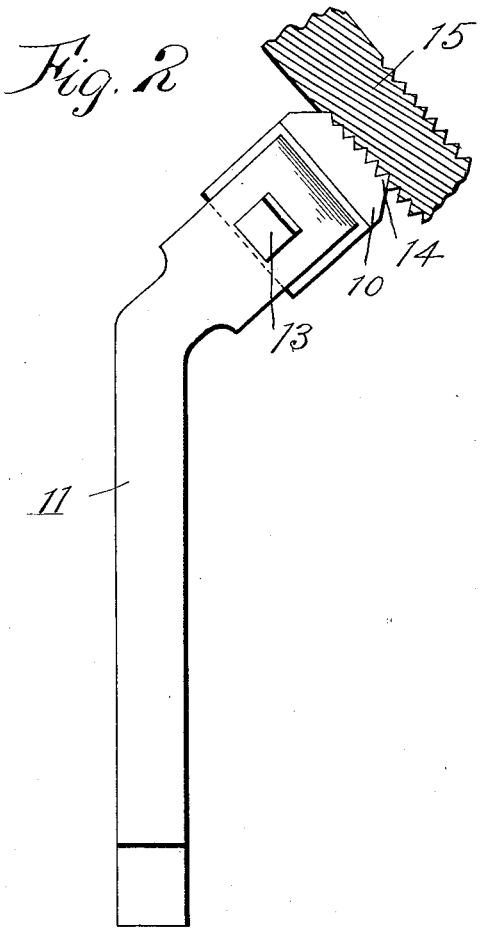
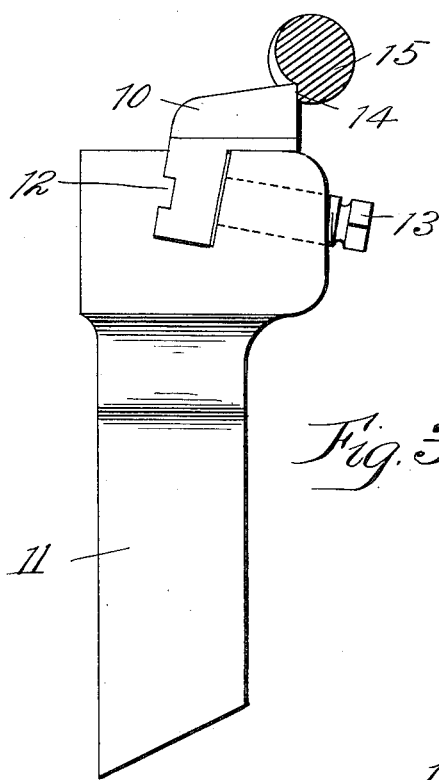
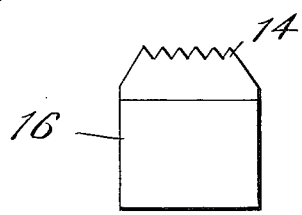
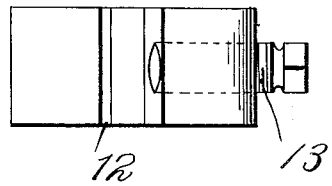
Witnesses
Wm P Hammond
R T Tomish
Inventor
Leonard Markel
By his Attorneys

UNITED STATES PATENT OFFICE.

LEONARD MARKEL, OF NEW YORK, N. Y.

METHOD OF AND MEANS FOR FORMING SCREW-THREADS.

936,249.

Specification of Letters Patent. Patented Oct. 5, 1909.

Application filed June 8, 1906. Serial No. 320,887.

*To all whom it may concern:*

Be it known that I, LEONARD MARKEL, formerly a subject of the Czar of Russia, having now formally renounced my allegiance to the Czar of Russia, and declared my intention of becoming a citizen of the United States, residing at 1360 Fifth avenue, New York city, in the county and State of New York, have invented a new and useful Method of and Means for Forming Screw-Threads, of which the following is a specification.

The main object of my invention is to reduce the cost of cutting screw threads by simplifying and quickening the operation, and, incidentally, reducing the wear and tear upon the lathe and cutting tools. In carrying out my invention to accomplish this object, I cut the preliminary thread upon the work-piece (or body to be threaded) in a lathe by the action of the cutting tool firmly clamped upon the traveling carriage of the lathe, the work and tool having relative rotary and longitudinal motions in a fixed helical path; and then, with the preliminarily threaded work-piece in the lathe, and a chaser (or the same tool) mounted upon the carriage so as to be capable of free movement parallel with the axis of the work-piece, I move the chaser inwardly (approximately radially of the work) against the threaded work-piece, continuing at the same time the relative rotary motion of the work-piece and tool, with the result that the chaser will be guided into working position, by its engagement with the preliminary thread on the work-piece. The chaser may be moved into operative position while the lathe is running or while it is at rest. The operation is continued until the preliminary thread is entirely retraced and chased out, the thread serving to retain the chaser in engagement and causing it to move longitudinally of the work-piece irrespective of the carriage, which of course travels along to afford the proper support for the chaser. After the tool or chaser has been positioned as explained, it may be clamped in position upon the carriage, although this is unnecessary. When performing the entire operation, the cutter is loosened upon the carriage and disengaged from the work-piece at the completion of the preliminary thread, and the carriage quickly returned by hand to starting position, when the same tool, (or another tool substituted in its place) supported loosely upon the carriage (so as to be capable of movement longitudinally of the work-piece) is moved into engagement with and guided by the threaded work-piece, and the preliminarily cut thread retraced in the manner above explained.

In order that my invention may be fully understood, I will first describe the same with reference to the accompanying drawings and afterward point out the novelty in the annexed claims.

In said drawings Figure 1 is a plan view of those portions of a lathe necessary to fully illustrate my new and improved method of and means for forming screw threads. Fig. 2 is a perspective view of the cutting tool showing its relation to the work-piece when in operation. Fig. 3 is a side elevation thereof. Fig. 4 is a front end view of the tool holder. Fig. 5 is a plan view of a chaser which may be used for the finishing cut.

Like reference numerals indicate like parts throughout the various figures.

Referring to Fig. 1, just those portions of the lathe are illustrated and described that are necessary to set forth and properly describe the method and means which are the subject of the present application. The bed frames are indicated at 1, having supported thereon the feed track rails 2. 3 indicates the feed screw and 4 the carriage mounted upon the feed track and engaged by said feed screw. 5 indicates the slide rest which is provided with the usual tool post 6; a chuck is indicated at 7 and a tail stock at 8, both of which are of ordinary construction and are employed for centering the work-piece. 9 indicates a drive cone pulley which is provided with the usual speed gears for regulating the speed of the lathe.

The cutting tool which is indicated at 10, Figs. 1, 2 and 3, is positioned, as shown, in a key slot in the head of the tool holder M. On the lower wall of this slot is formed a projecting longitudinal key rib 12, which conforms to a key slot or groove in the shank of the cutting tool 10, for the purpose of providing a key guide therefor to allow movement of the tool in the holder parallel with the work, and prevent movement in any other direction. By this means the tool is accurately held in absolute alinement. A set screw 13, provided in the head of the tool holder, bears down upon the shank of the cutting tool for holding it rigid when the first or initial cut is being made. The cutting tool is preferably provided with a plurality of graded cutting teeth 14 of any desired pitch, to effectively and accurately cut the thread upon the work-piece with a minimum amount of strain upon the tool, but this form of the tool is not essential to my invention.

15 indicates the work-piece which is illustrated as receiving its first or initial cut. The chaser 16 (Fig. 5) may be used for giving the finishing cut.

From the above general description of the arrangement of the tool holder and tool constructed according to my invention, the improved method of cutting screws will be understood from the following explanation: Assuming that the work-piece has been properly set up in the lathe and the cutting tool 10 properly mounted in the tool holder 11, and held rigidly against movement therein by the set screw 13, the tool is presented in proper working relation to the work by mounting the tool holder 11 in the tool post and adjusting the parts to bring them in proper relation. The lathe is started with the result that the work-piece will be rapidly rotated and the carriage, under the action of the feed screw 3, will be gradually moved parallel with the work-piece, thereby providing relative rotary and longitudinal motions between the work-piece and tool in a fixed helical path. The cutting operation is continued in this described helical path until a preliminary thread of the desired length of the work-piece is produced, when the slide of the carriage is moved outwardly for disengaging the cutting tool from the work and the carriage 4 is disengaged from the feed screw 3 and manually moved back to approximately the position of starting the threading work. The set screw 13 is then loosened in order that the cutting tool 10 may be removed and replaced by the chaser 16, or if preferred the chasing operation may be performed with the same cutting tool 10. Whichever is used for the chasing operation, the set screw 13 is allowed to remain in its loosened position so that the tool will be supported in the tool holder free to move therein parallel with the work. With the tool loosely mounted in the tool holder, the carriage slide is moved inwardly approximately radially to the work until its cutting teeth come into engagement with the preliminary thread on the work-piece, which engagement will automatically adjust the chasing tool into proper working relation with the preliminary thread on the work-piece, the tool being permitted by its loose mounting to yield longitudinally of the work to suit the requirements of the automatic adjustment. When the tool has been thus set in operative engagement with the preliminary thread of the work-piece, the carriage is again engaged with its feed screw preparatory to the chasing operation, or in fact if preferred, the carriage can be reëngaged with its feed screw before the tool is moved into working relation with the work-piece. Immediately following the proper positioning of the tool in the manner explained, the final chasing operation is performed by retracing the same helical path upon the work-piece by continuing the described relative rotary and longitudinal motions between the work and tool.

If preferred the lathe can be run continuously from the beginning to the end of my improved screw cutting operation. In some cases it may be desirable to arrest the operation of the lathe at the completion of the preliminary cut and allow the lathe to remain at rest until the loosely mounted chasing tool has been positioned in readiness for the chasing operation, when the lathe can be again started. The automatic positioning of the loosely mounted tool by the engagement of the preliminarily threaded work-piece with the tool is the same whether the lathe is running or is at rest. After the chasing tool has been properly brought into working relation with the preliminarily cut thread, the set screw 13 may be tightened to clamp the chasing tool in the tool holder so as to complete the chasing operation under substantially the same conditions as the preliminary cut, but it is not necessary to so tighten the set screw during any part of the chasing operation, for the reason that the engagement of the preliminary thread with the tool will maintain the proper working relation between the work and tool throughout the chasing operation. This is particularly so in view of the fact that the lead screw of the lathe is continuously feeding the carriage to afford the proper support for the tool, the pitch of the thread formed on the work-piece being the same as that of the lead screw. In performing this screw cutting operation, it is of the utmost importance in the production of accurate work, to properly support the cutting tool to operate absolutely parallel with the work-piece. My improved tool holder and tool having inlocking key guides or ribs which extend parallel with the work-piece when the parts are in operative relation, enable me to accurately support the cutting tool in the described relation with the work, and at the same time permit the free relative movement between the tool and work in a direction longitudinally of the work to accomplish the automatic positioning of the tool for the second or chasing cut of the screw.

The most important feature of my improved method and of the tool by which the method is practically operated, is the feature of providing free relative movement between the work-piece and tool during the starting of the finishing or chasing operation. This feature not only insures the accurate positioning of the tool with reference to the preliminary thread of the workpiece, but it enables the operator to quickly position the chasing tool, thereby avoiding the feature of most delay and the requirement of the greatest skill on the part of the operator under the processes heretofore employed for cutting screw threads. In performing the screw cutting operation under my improved method with the means set forth, it is unnecessary to exercise the extreme care and skill that have been required under old methods for the simple reason that the provision for free movement of the tool longitudinally of the work absolutely prevents the injury of the work since it is impossible to make an incorrect start of the chasing cut. With my improved method I save a great deal of time that has heretofore been lost because I can accomplish the preliminary cutting and finishing of the thread upon the work-piece without stopping or reversing the lathe. This feature is important because it minimizes the work and expenditure of time. With my method it is not necessary to run the carriage back by the action of the lead screw of the lathe, which is at present frequently done for the purpose of maintaining the proper relation between the tool and the work to insure against errors in positioning the tool for the finishing cut.

Another practical feature of importance incident to my invention is the convenient provision for sharpening the cutting tool. Without disturbing the adjustment of the lathe or the tool holder upon the carriage, the tool may be removed from the slot of the tool holder and sharpened and replaced in readiness to proceed immediately with the screw cutting operation without further concern with reference to the adjustment of the parts. The simplicity of the method and means is also of great practical importance.

I would have it understood that my invention is not limited to any particular form of screw cutting tool or chaser excepting as to the provision for mounting to allow freedom of movement longitudinally of the work at the start of the chasing operation.

What I claim is:

1. The method of cutting screw threads which consists in providing, by relative rotary and longitudinal motions between the work and tool, a fixed helical path on said work, and then retracing the same path with a tool held positively in fixed cutting relation to the work and having freedom of movement longitudinally of the work.

2. The combination, with a lathe having a rotatable work support, and a traveling carriage movable longitudinally and at one side of the work support, of a tool holder mounted upon the carriage and formed with a tool-receiving key slot extending parallel with the axis of the work support, and a cutting tool loosely fitting said slot so as to be presented in cutting relation to the work at one side and movable in the tool holder longitudinally of the work support.

3. The combination, with a lathe having a rotatable work support, and a traveling carriage movable longitudinally of the work support, of a tool holder mounted upon the carriage and formed with a tool-receiving key slot extending parallel with the axis of the work support, a cutting tool loosely fitting said slot and movable in the tool holder longitudinally of the work support, and a set screw upon the tool holder adapted to engage and secure the tool.

LEONARD MARKEL.

Witnesses:
WM. P. HAMMOND,
C. F. SONNEK.